United States Patent [19]

Howes

[11] Patent Number: 5,368,167

[45] Date of Patent: Nov. 29, 1994

[54] VIBRATING CONVEYOR SCREENING METHOD AND APPARATUS

[75] Inventor: Glenn E. Howes, Surrey, Canada

[73] Assignee: Edem Steel Ltd., Surrey, Canada

[21] Appl. No.: 780,216

[22] Filed: Oct. 22, 1991

[51] Int. Cl.$^5$ .............................. B07B 1/34; B07B 1/49
[52] U.S. Cl. ................................ 209/395; 209/325; 209/396; 209/405; 209/409; 198/759; 198/766
[58] Field of Search ............... 209/320, 325, 329, 395, 209/396, 405, 409, 674; 198/752, 759, 763, 766

[56] References Cited

U.S. PATENT DOCUMENTS

| | | | |
|---|---|---|---|
| 1,755,277 | 4/1930 | Staup | 209/674 X |
| 2,020,800 | 11/1935 | Royer | 209/396 |
| 2,128,603 | 8/1938 | Davies | 209/396 |
| 2,157,562 | 5/1939 | Overstrom | 198/766 X |
| 3,347,368 | 10/1967 | Mogensen | 209/674 X |
| 3,528,541 | 9/1970 | Barton et al. | 198/220 |
| 3,543,928 | 12/1970 | Green | 209/674 X |
| 3,703,236 | 11/1972 | Spurlin et al. | 198/766 X |
| 3,784,007 | 1/1974 | Skrmetta | 209/674 |
| 3,799,336 | 3/1974 | Holman | 209/674 X |
| 4,240,588 | 12/1980 | Fulghum, Jr. | 209/674 X |
| 4,504,386 | 3/1985 | Dyren et al. | 209/254 |
| 4,558,787 | 12/1985 | Danielsson et al. | 209/626 |
| 4,660,726 | 4/1987 | Woode | 209/674 |
| 4,664,790 | 5/1987 | Lundqvist | 209/395 |
| 4,802,591 | 2/1989 | Lower et al. | 209/395 X |
| 4,956,078 | 9/1990 | Magerowski et al. | 209/395 X |

FOREIGN PATENT DOCUMENTS

| | | | |
|---|---|---|---|
| 184213 | 4/1907 | Germany . | |
| 0241870 | 1/1987 | Germany | 209/674 |
| 3738082 | 6/1988 | Germany . | |
| 629904 | 10/1949 | United Kingdom . | |
| 900704 | 7/1962 | United Kingdom . | |
| 8501456 | 4/1985 | WIPO . | |

OTHER PUBLICATIONS

"Vibrating Conveyors for the Wood Products Industry" published by Edem Steel Ltd., Jan. 1990.
Database WPI, Week 7450, Derwent Publications Ltd., AN 74–86661V[50] and SU,A,410 826 (Minerals Mech Processing) 17 May 1974.

Primary Examiner—Joseph E. Valenza
Assistant Examiner—Tuan N. Nguyen
Attorney, Agent, or Firm—Bull, Housser & Tupper

[57] ABSTRACT

A screen assembly according to the invention screens material by size and includes first and second sets of transversely spaced apart, longitudinally extending first and second members respectively. The members are parallel to each other, and some members of the second set are located between some members of the first set. At least one of the sets is mounted to vibrate along a longitudinal axis to feed material therealong. A plurality of longitudinally spaced apart, transversely extending third members are located between adjacent first and second members so as to define a plurality of screen openings between the first, second and third members. Third members are mountable so as to be out-of-phase with vibrations of at least one of the first or second sets of longitudinally extending members. The screen assembly can be installed in a vibrating conveyor, such that the first members vibrate with a pan of the conveyor, so as to feed material along the first members. With a dynamically balanced conveyor, the second members are connected to structure for dynamically balancing the conveyor, and thus are vibrated out-of-phase with the first members.

23 Claims, 7 Drawing Sheets

VIBRATING CONVEYOR SCREENING METHOD AND APPARATUS

BACKGROUND OF THE INVENTION

The invention relates to a method and apparatus for screening relatively fine material from a mixture of material, particularly for use on a dynamically balanced vibrating conveyor apparatus.

In materials processing systems, vibrating conveyors are commonly used to carry material from one operation to the next. For some operations to be performed effectively, the material being conveyed often requires a separation process in which fine material is removed from coarser material. One example in the forest products industry relates to feeding waste wood to chippers which convert the waste wood to chips used in the pulp and paper industry. It is useful to remove fine materials such as sawdust, dirt and small pieces of wood from the waste wood before chipping to minimize the amount of material passing through the chipper. This removal of fines minimizes the amount of fine material to be screened from the chips after the chipping operation, and also lessens the dulling effect of the fine material on the chipper knives.

Usually, separation of fine material is performed by a simple mechanical screen which is installed in a pan of a vibrating conveyor, the screen comprising either a flat plate with openings, or a woven or welded wire screen. Either of these types of screens suffers from at least two deficiencies. Firstly, the holes in the screen tend to become plugged with pieces of wood which are sufficiently small to enter the openings, but are too large to pass right through the openings. Secondly, weight of wood being conveyed along the conveyor and over the screen can deform the screen and eventually break the screen.

Various attempts have been made to improve conventional screening as described above. Two such attempts are disclosed in U.S. Pat. No. 4,504,386 issued to Dyren et al, and U.S. Pat. No. 4,664,790 issued to Lundqvist. Both of these patents disclose screening structure for vibrating conveyors, in which the screening structure has two sets of elongated elements, for example rods, bars, etc. which extend axially along a portion of the conveyor. Elements of each set alternate with each other and are spaced transversely apart to provide elongated gaps therebetween. Material passing along the conveyor that is narrower than the gaps falls through the gaps, whereas material that is larger than the gaps is conveyed across the rods to the end of the conveyor. Because both of the above screening assemblies rely on elongated gaps for separation, long thin strips of wood can pass through the openings, which is undesirable in some processing operations. Furthermore, in Dyen et al, vibrations are applied to only one of the sets of elongated members and the remaining set is stationary which could detract from efficient displacement of material along the conveyor. In Lundqvist, a first set of members is vibrated with a conveyor, whereas the second set of members can be vibrated with a separate vibrating system, whose frequency and phase can be varied with respect to the vibration of the conveyor. While the vibration of the first set, being associated with the conveyor, would appear to result in translation of material, vibrations of the second set appear to be separate from translation, and thus would not contribute to useful movement of material along the conveyor.

A further screen structure for wood chips is shown in U.S. Pat. No. 4,660,726, issued to Woode, which discloses two sets of reciprocating bars having serrated tops, the bars being mounted for out-of-phase vibration in a generally horizontal plane. There does not appear to be any attempt to feed the material across the screen by a normal vibrating conveyor motion, but instead the screen is sloped so that material is conveyed by the action of gravity.

From the above it is seen that prior art two-set screening systems incorporated into vibrating conveyors would appear to pass elongated thin material, which is not always acceptable, and commonly the screens detract from the normal conveying motion due to the mode of vibration of one or both of the sets of screen material. Furthermore, in applications where both sets of screen materials are vibrated, a separate vibrating system is required, increasing cost and complexity of the structure.

SUMMARY OF THE INVENTION

The invention reduces some of the difficulties and disadvantages of the prior art by providing a method and apparatus for screening fine material from a stream of material, particularly for use on a vibrating conveyor. The screen does not affect operation of the conventional conveyor, does not detract from movement of the coarser material along the conveyor, and does not require additional power sources. In addition, the screen can be easily adapted to be made as a retro-fit kit to be installed on an existing vibrating conveyor, so as to provide the advantages of the invention with only a small increase in capital cost. Furthermore, the screen can be used in a conveyor that is feeding material in horizontal, downwards or slightly upwards direction with negligible change in performance of the conveyor. Also, elongated fine material of a particular minimum length does not pass through the screen due to the shape and size of the screen openings. Instead such elongated material is fed with the coarser material along the pan, thus restricting entry of undesirable elongated material through the screen.

The method according to the invention comprises the steps of:
vibrating a first set of transversely spaced apart, longitudinally extending first members,
vibrating a second set of transversely spaced apart, longitudinally extending second members out-of-phase with vibrations of the first set, some of the second members being located between some of the first members,
locating a plurality of longitudinally spaced apart, transversely extending third members which extend between adjacent first and second members to define a plurality of screen openings between the first, second and third members.

Preferably, a first group of the third members is vibrated in phase with vibrations of the first members and, if desired, a second group of the third members is vibrated in phase with vibrations of the second members.

Preferably, the screening method is used in combination with a vibrating conveyor apparatus, and is further characterized by vibrating a conveyor pan of the vibrating conveyor apparatus in phase with the first set of first members so as to feed material along the conveyor and along the first members. Also, for use with a dynamically balanced conveyor, the method is characterized by vibrating a balancing structure thereof out-of-phase with the conveyor pan so as to dynamically balance the conveyor apparatus, and connecting the second set of second members to the balancing structure so that the second set of second members vibrates in phase with the balancing structure, and out-of-phase with the first set of first members.

A screen assembly according to the invention can be used as a retro-fit kit for installation on an existing conveyor and comprises first and second sets of transversely spaced apart, longitudinally extending first and second members respectively. The members are parallel to each other, and alignable with a longitudinal axis. Some members of the second set are locatable between some members of the first set, and at least one of the sets is mountable to vibrate along the longitudinal axis. The screen assembly further comprises a plurality of longitudinally spaced apart, transversely extending third members located between adjacent first and second members so as to define a plurality of screen openings between the first, second and third members. The third members are mountable so as to be out-of-phase with vibrations of the said at least one of the first or second sets of longitudinally extending members.

Preferably, the assembly is mountable in a conveyor pan of a vibrating conveyor apparatus, with the said longitudinal axis being aligned with an axis of vibration of the conveyor. One of the sets of the longitudinal members is mountable to vibrate in phase with the vibration of the conveyor pan to feed the material therealong. Preferably, the conveyor is dynamically balanced and has a balancing structure operable 180 degrees out-of-phase with the pan. The assembly further comprises first mounting means for connecting the first members together and to the pan of the conveyor, so that the first set of first members is vibrated in phase with the conveyor pan. The assembly further comprises second mounting means for connecting the second members together and to the balancing structure of the conveyor apparatus so as to be vibrated in phase with the balancing structure. The first mounting means for connecting the first members together comprises a rectangular frame securable to the conveyor pan and including a pair of longitudinally extending side frame members and a pair of transversely extending end frame members.

A detailed disclosure following, related to drawings, describes a preferred method and apparatus according to the invention which is capable of expression in method and apparatus other than those particularly described and illustrated.

DETAILED DISCLOSURE

Figure 1:
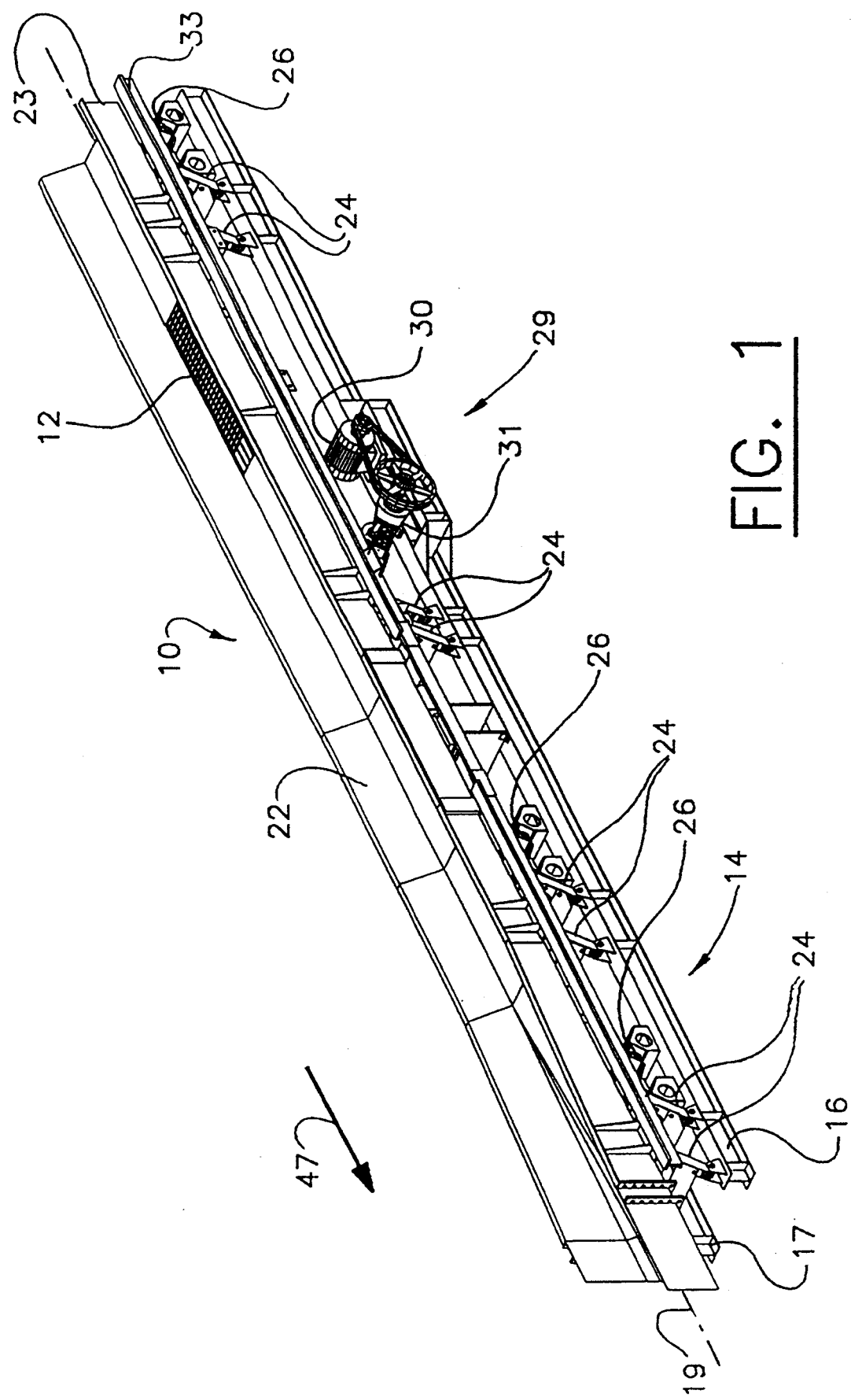
FIG. 1 is a simplified, fragmented perspective of a prior art dynamically balanced vibrating conveyor apparatus, the prior art structure being modified so as to be fitted with a screen assembly according to the invention.
Figure 2:
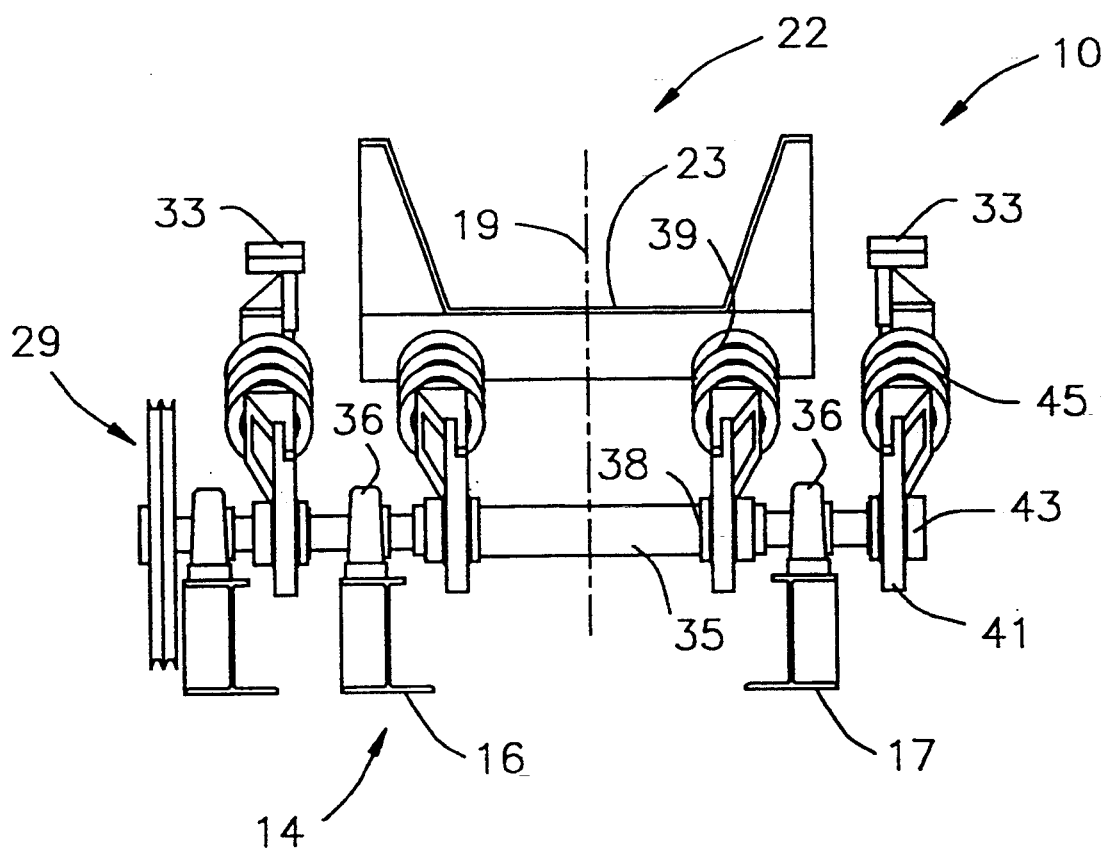
FIG. 2 is a simplified transverse section through the conveyor of FIG. 1, showing a preferred means of powering the conveyor and a dynamic balancing structure.

FIGS. 1 and 2

A vibrating conveyor apparatus 10 is generally similar to prior art vibrating conveyor apparatus with the exception of a simple modification to accept a screening apparatus 12 according to the invention. Consequently, only a brief description of the vibrating conveyor apparatus will be provided because its construction and operation are essentially identical to prior art dynamically balanced vibrating conveyors.

As seen in FIG. 1, the apparatus 10 includes a base assembly 14 comprising a pair of parallel girder supports 16 and 17 extending along a main longitudinal axis 19 of the conveyor. A conveyor pan 22 is supported above the base assembly 14 on a plurality of longitudinally spaced apart rocker legs, severally 24. The rocker legs have lower ends hinged to the girder supports 16 and 17, and upper ends hinged to positions adjacent a base 23 of the pan, so as to provide a parallelogram hinged mechanism which permits relative movement between the pan and the base so that the pan remains essentially parallel to the base with limited swinging movement as is well known.

The conveyor apparatus also includes a plurality of spring supports, severally 26, which are similarly spaced longitudinally along the apparatus as required and provide a resilient mounting for the pan which can vibrate at or close to its resonant frequency. It is noted that the rocker legs are inclined in one direction, and the spring supports are inclined in an opposite direction, so as to provide resilient mounting to limit ends of the stroke of the conveyor as will be described. A vibrating mechanism 29 includes a motor 30 and an eccentric drive mechanism 31 powered by the motor through belts. The apparatus 10 also includes a pair of longitudinally extending balance bars 33, one only being shown in FIG. 1, fitted on each side of the pan 22 and cooperating with the eccentric drive mechanism 31, as best seen in FIG. 2.

Referring to FIG. 2, the eccentric drive mechanism 31 includes an eccentric shaft 35 extending transversely underneath the pan 22 and being journalled in main shaft bearings 36 mounted on the girder supports 16 and 17. As the vibrating structure on opposite sides of the eccentric shaft is essentially identical, one half only of the shaft will be described. The shaft 35 carries an inner bearing 38 which provides a mounting for a drive spring 39 of the mechanism 31. The drive spring provides a resilient mounting which permits accommodation of misalignment due to the eccentric drive and reduces power required to initiate vibration of the conveyor pan. The shaft 35 has an outer bearing 41 adjacent the outer end, the outer bearing being mounted on an eccentric bushing 43 secured to the shaft 35 so that eccentricity of the bushing 43 is diametrically opposite to eccentricity of the shaft 35. Thus, when the shaft 35 rotates, in a particular instance the inner bearing 38 is at a lowermost position, and the outer bearing 41 is at an uppermost position. The outer bearing 41 carries a drive spring 45 which is coupled to the balance bar 33 to function similarly to the drive spring 39. Thus, due to the phase difference between the eccentric bushing 43 and the eccentric shaft 35, vibration applied to the conveyor pan 22 is 180 degrees out-of-phase with vibration applied to the balance bar 33, which, following common practice, results is dynamically balancing the conveyor apparatus.

Much of the above description describes a relatively conventional dynamically balanced vibrating conveyor. The operation of the conveyor is well known, and material is transported along the conveyor in a feed direction, arrow 47, in a series of short "hops" resulting from the vibration which has a relatively long generally horizontal component with a relatively short vertical component.

FIGS. 3 through 7

Figure 3:
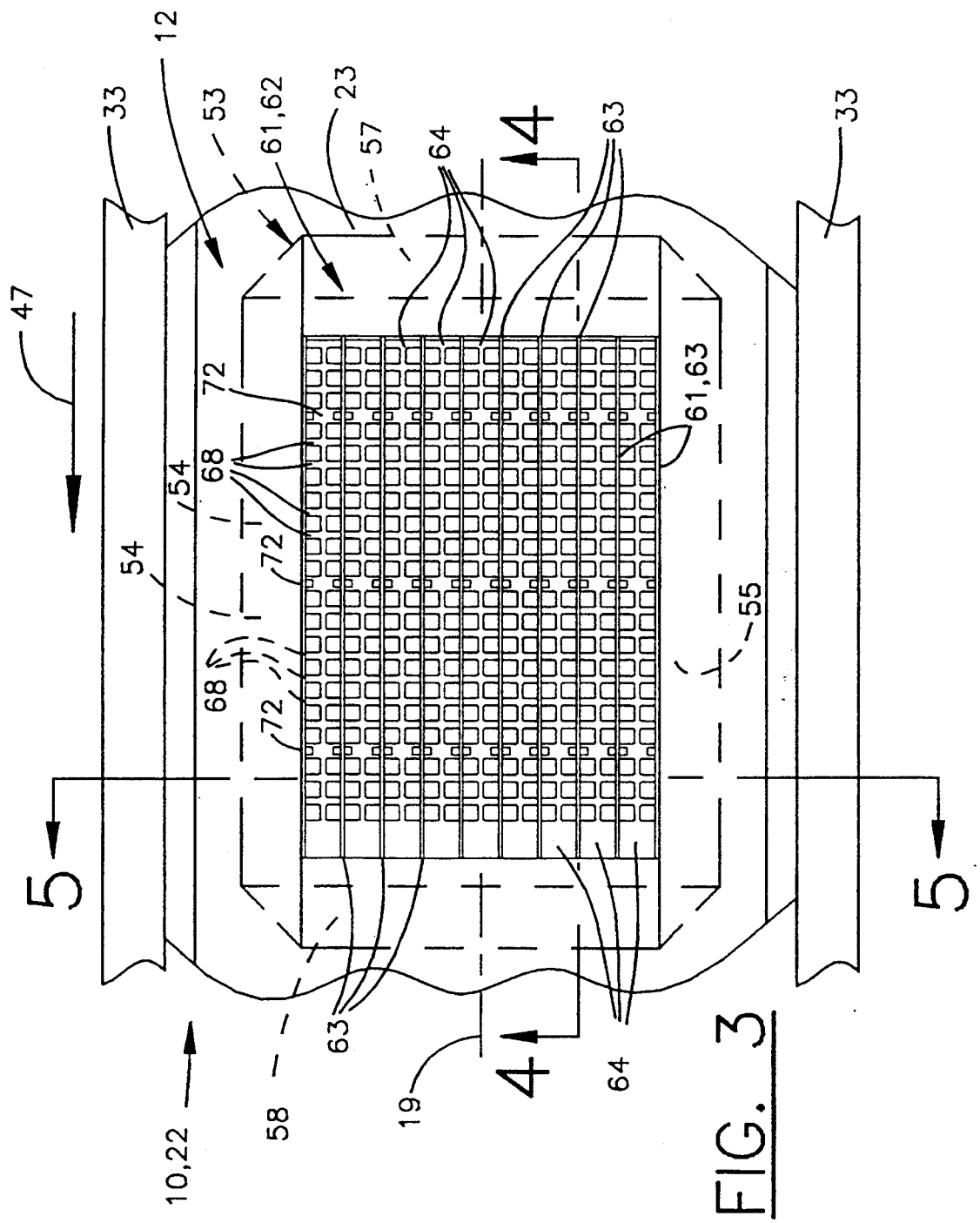
FIG. 3 is a simplified fragmented top plan view of a portion of the conveyor assembly, showing the screen assembly according to the invention.
Figure 4:
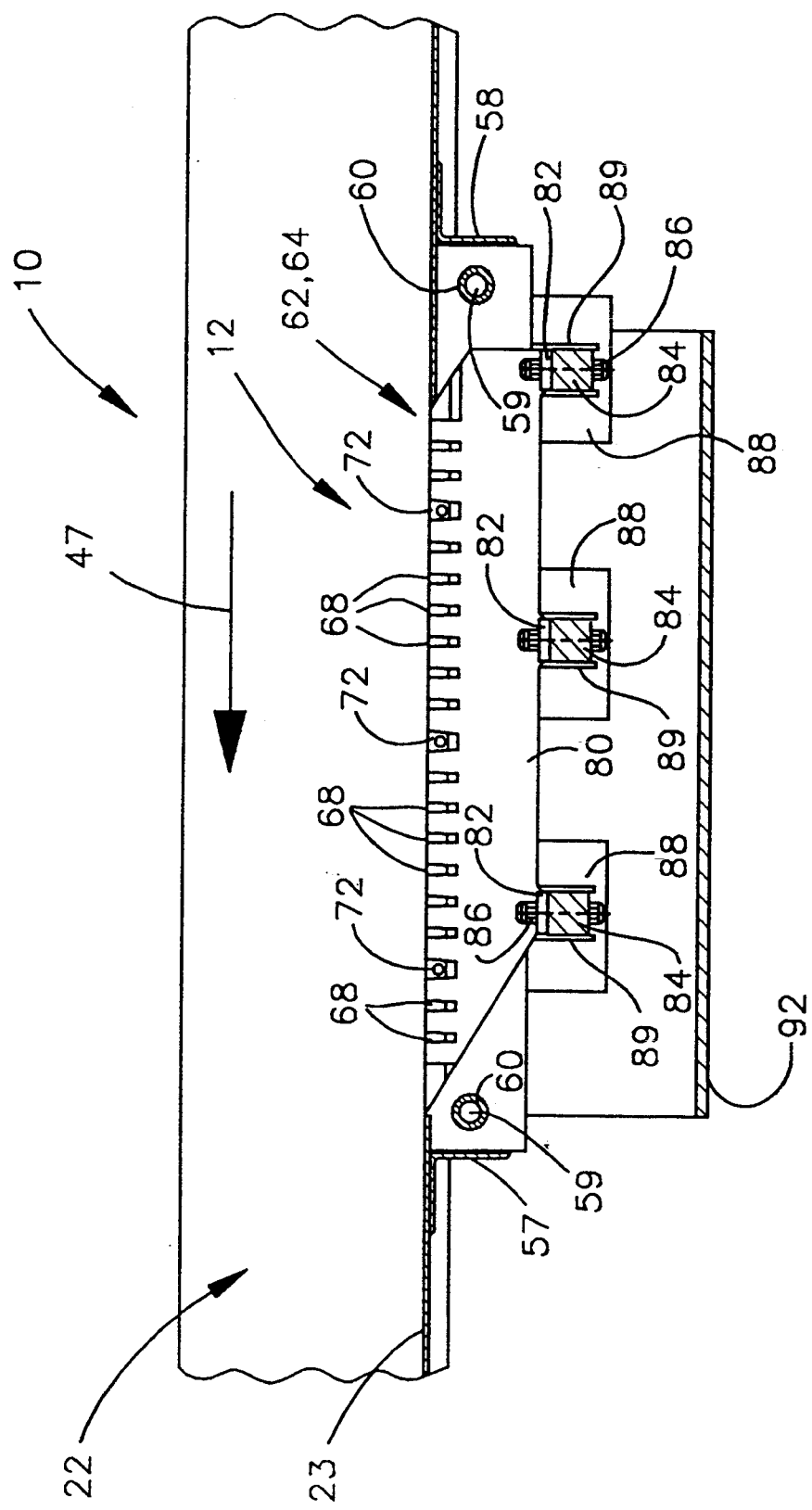
FIG. 4 is a simplified, fragmented longitudinal section of the screen assembly and adjacent structure as seen from line 4—4 of FIG. 3.
Figure 5:
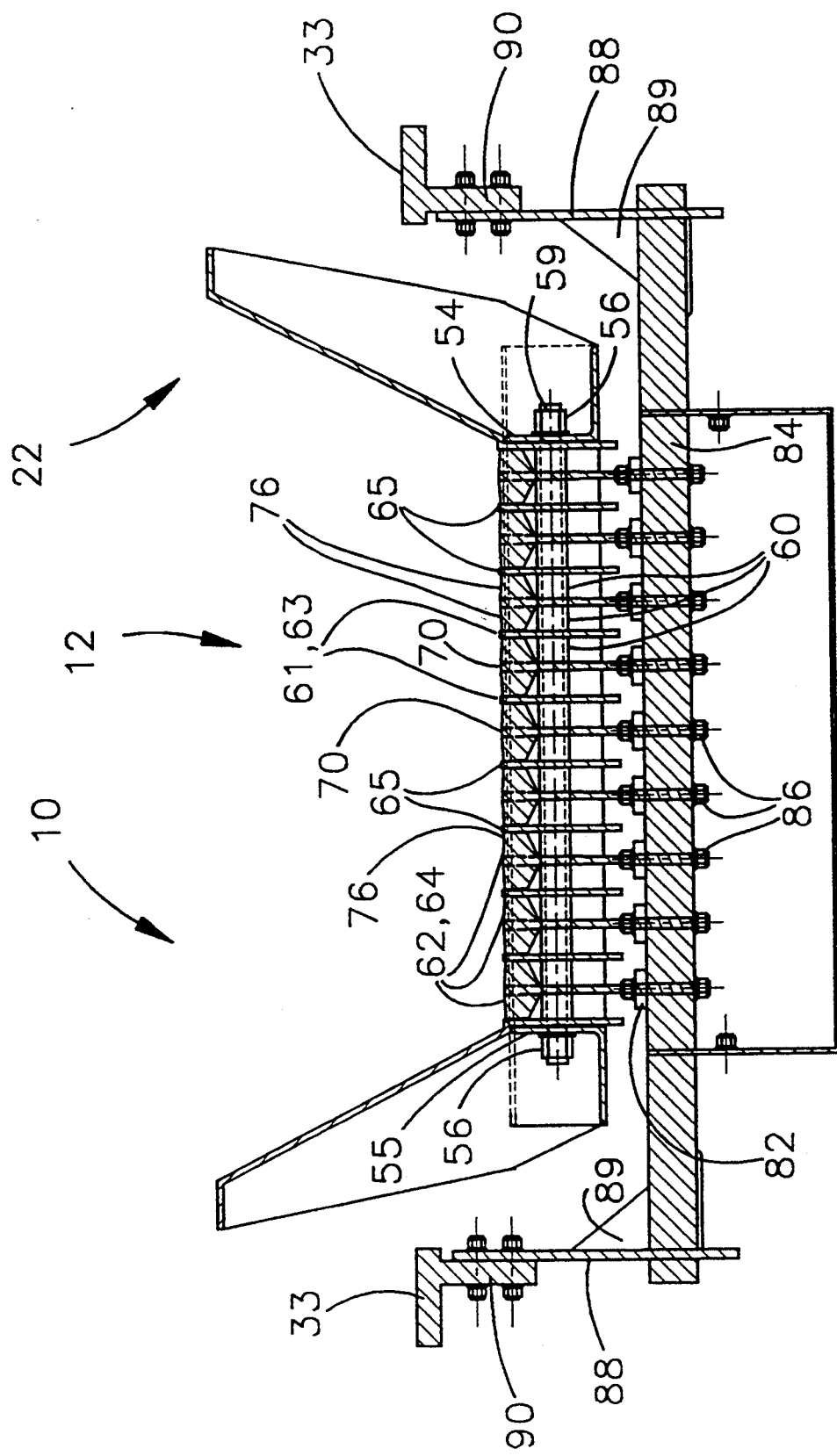
FIG. 5 is a simplified, fragmented transverse cross-section of the screen assembly and adjacent conveyor structure as seen from line 5—5 of FIG. 3.

As seen partially in broken line in FIG. 3, the screening apparatus 12 according to the invention is mounted in the conveyor pan 22 and has a perimeter defined by a rectangular frame 53 having a pair of longitudinally extending side frame members 54 and 55, and a pair of transversely extending end frame members 57 and 58 connected together at ends thereof. As seen in FIGS. 4 and 5, the side frame members 54 and 55 and the end frame members 57 and 58 are L-sectioned strips or angle strips, which can be welded together and to appropriate portions of the conveyor pan 22 to provide a stiff frame which does not detract from the strength of the conveyor pan.

Figure 6:
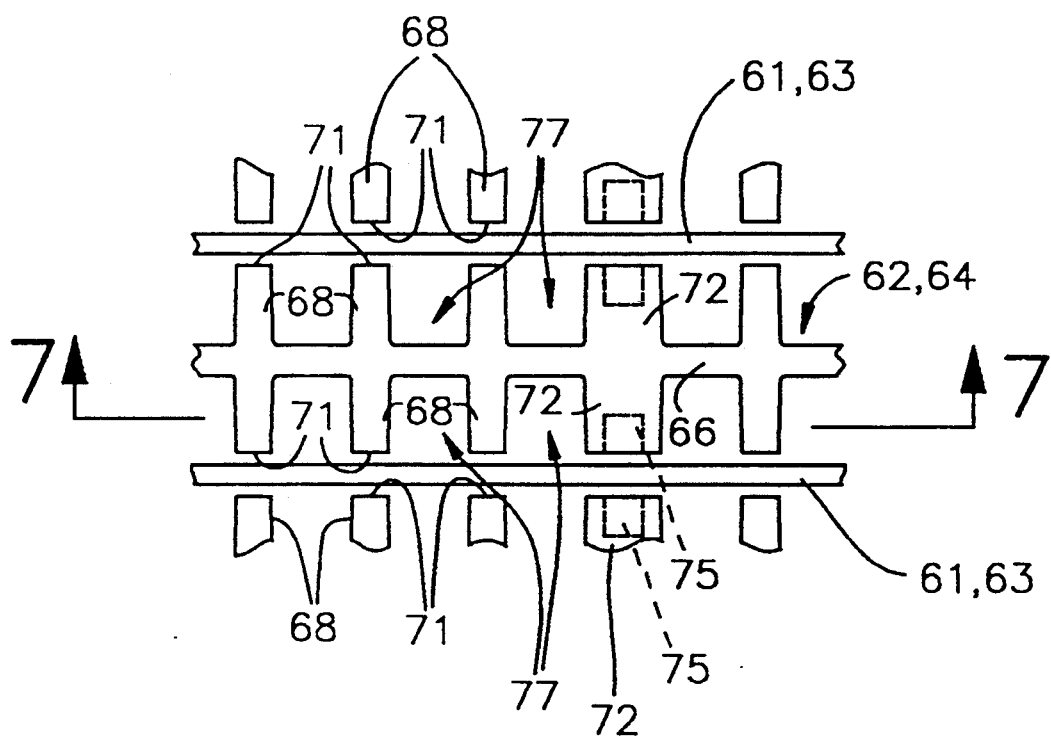
FIG. 6 is a simplified top plan view of several screening members according to a first embodiment of the invention.
Figure 7:
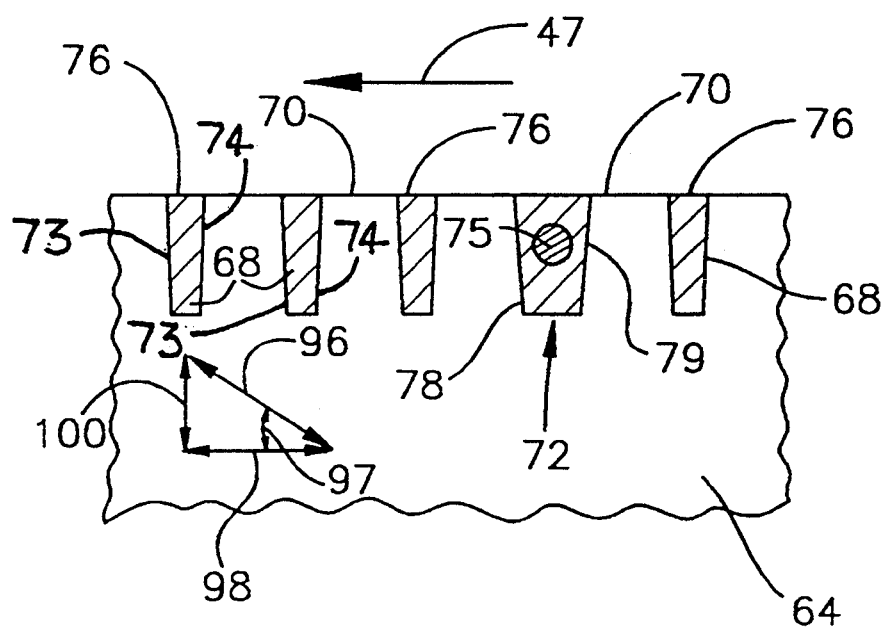
FIG. 7 is a simplified side elevation of one screening member of FIG. 6.

The screen assembly further includes first and second sets 61 and 62 of transversely spaced apart, longitudinally extending first and second members 63 and 64 respectively, only some of the members being designated in FIG. 3, and being best seen in FIGS. 6 and 7. The members are parallel to each other and aligned with the longitudinal axis 19 of the conveyor. The members 64 of the second set are located between the members 63 of the first set, and while the first and second members are shown to alternate with each other across the width of the conveyor pan, alternative structures could be devised in which two of the members of the same set could be fitted adjacent each other.

Opposite ends of the first members are provided with undesignated openings which can be aligned with adjacent ends of the adjacent first members. Each end of the side frame members of the rectangular frame 53 has aligned openings to carry a transverse mounting rod 59 closely adjacent a respective end frame member, the rod having threaded outer ends and being releasably secured to the respective side frame members by nuts 56. The rods 59 pass through the aligned openings in the ends of the first members so that the first members are supported at opposite ends. A plurality of spacer sleeves 60 are received on the rods 59 and interposed between adjacent first members to maintain spacing between the first members. This provides a simple means of mounting the first members, to permit adjustment of spacing between the first members as required, or replacement of first members as they become worn or damaged. Clearly, other means can be provided to mount the ends of the first members with respect to the rectangular frame 53. Thus, opposite ends of the first members are secured to the frame members to provide first mounting means for connecting the first members together and to the conveyor pan.

The first members are seen in FIGS. 6 and 7 to be generally rectangular flat bars disposed with narrow edges uppermost, to provide a parallel grid with upper portions co-planar with the base 23 of the pan Clearly, as the first members are connected to the pan, the first members vibrate in phase with the conveyor pan. Furthermore, the first members have adequate thickness and depth to support loads carried on the conveyor pan with negligible deflection of the first members to reduce chances of interference with the second members due to load carried on the conveyor.

As best seen in FIGS. 5, 6 and 7, each second member 64 has a longitudinal portion 66 which resembles a flat bar and is disposed to be parallel to the remaining second members and the first members, and is of similar thickness to the first member. As best seen in FIG. 6, the second member 64 also includes a plurality of similar, transversely extending, lateral projections 68, which extend parallel to each other from each side of the portion 66 of the second member in opposite directions and towards adjacent first members. Adjacent first members are spaced apart from each other at a first member spacing 69, and the longitudinal portion 66 of the second member 64 is positioned approximately halfway between the adjacent first members. Consequently, the lateral projections 68 extend from the second member towards the first members a distance somewhat less than one half of the first member spacing, defining transverse width of the projections 68, so that end faces 71 of the lateral projections are spaced closely to the adjacent first member, but not in contact therewith.

As seen also in FIGS. 5–7, each second member 64 has three generally similar bearing projections 72 which, similarly to the lateral projections 68, extend parallel to each other from each side of the portion 66 in opposite directions and towards adjacent first members. The bearing projections are spaced generally equally longitudinally along each second member to provide longitudinally spaced apart bearing surfaces to reduce friction that might otherwise be excessive should there be unintentional contact between the first and second members due to excessive lateral deflection of the members. End faces of each bearing projection 72 are provided with low friction bearing pads 75, such as a bronze insert, which project from the member 64 somewhat further than end faces 71 of the lateral projections, so that, if clearance between the first and second members decreases, the bearing pads 75 of the bearing projections 72 would contact the first members before end faces 71 of the lateral projections.

As seen in FIG. 7, each lateral projection has a pair of downwardly converging side faces 73 and 74, and thus have a generally narrow truncated triangular section. As best seen in FIG. 5, the end faces 71 similarly converge downwardly and inwardly towards the longitudinal portion 66, and thus each projection 68 is a generally downwardly converging prism which is connected to a vertical face of the longitudinal portion 66 and extends outwardly to a position closely spaced from an adjacent first member. The longitudinal portion 66 of the second member, side faces of the lateral projections 68, and the adjacent first members define generally square-shaped screen openings 77 along each side of the longitudinal section 66, and between the first members. The screen openings 77 have cross-sectional areas which increase downwardly to reduce chances of items becoming lodged in the openings.

Similarly to the lateral projections 68, the bearing projection 72 have a pair of downwardly converging side faces 78 and 79. Because the bearing projections 72 is provided in a position where normally there would be a lateral projection 68, a projection 72 with adjacent lateral projections 68 also defines generally square-shaped screen openings 77. Clearly, the lateral projections 68 and bearing projections 72 function similarly, with the added advantage that the bearing projection 72 also serves to maintain clearance between the first and second members. For convenience of terminology, the lateral projections 68 and bearing projections 72 are termed third members, which are clearly mechanically connected to the second members 64 and thus move in a similar manner as will be described. Thus it can be seen that, in addition to first and second members, the screening apparatus 12 further comprises the plurality of longitudinally spaced apart, transversely extending third members 68 or 72 located between adjacent first and second members 63 and 64 so as to define the plurality of generally square-shaped screen openings 77 between the first, second and third members. Preferably, the first, second and third members have upper edge portions 66, 70 and 76 respectively which are located within a common plane, which is generally co-planar with the base 23 of the conveyor pan.

As best seen in FIG. 4, a typical second member 64 has a lower portion 80 which has outwardly extending horizontal brackets 82 and adjacent clearance openings located at three positions along the length thereof. The brackets are connected with nuts and bolts 86 to respective transverse support bars 84, three being shown, each of which extends transversely across the screen assembly and ultimately connects to the balance bar 33 as will be described. The support bars 84 have vertical openings to receive the bolts, and the nuts are received in the clearance openings adjacent the brackets in the lower portions 83. Thus, lower edges of each second member 64 are located with respect to each other by rigid connections through intermediate portions of the bars 84, which also support load carried on the second members to resist deflection of the second members under load carried on the conveyor. Thus, it can be seen that both the first members and second members are securely located with respect to the conveyor pan and load from material carried on the conveyor deflects the first and second members negligibly, in contrast with the prior art perforated sheet metal screens commonly used to screen fine material from conveyors.

Referring to FIG. 5, opposite ends of a typical transverse support bar 84 extend to portions generally beneath the bars 33. Respective brackets 89 are secured to ends of the bar 84, which are connected to vertical plates 88 which, in turn, are connected to lower flanges 90 of the balance bars 33. A lower conveyor pan 92 is also connected to the vertical plates 88 to extend beneath the screening apparatus 12 to collect fine material passed therethrough. The pan 92 is connected to the balancing bars 33, and thus vibrates in phase therewith to transport fine material therealong to a separate discharge area as required.

As previously stated, the balance bars 33 are actuated to vibrate out-of-phase with the conveyor pan and thus, through the plate 88 and the bars 84, this out-of-phase movement will be transferred to the second members 64. Thus the transverse support bars 84, the plates 88 and related structure serve as second mounting means for connecting the second members together and to a portion of the conveyor apparatus so as to vibrate in phase with the balancing structure, and thus out-of-phase with the conveyor pan. While three support bars 84 are shown, clearly at least two bars would be required to provide adequate support for at least opposite ends of the second members.

OPERATION

The vibrating conveyor apparatus 10 is operated in a manner that is common for such apparatus. The eccentric drive mechanism 31 applies a relatively shallow arcuate oscillation to the pan, which can be shown diagrammatically in FIG. 7 as a motion having an oscillating amplitude 96 which resembles an essentially linear vibratory motion and is inclined at an angle 97 to the longitudinal axis 19 of the conveyor when viewed laterally. Consequently, the motion has a relatively large horizontal displacement component 98, i.e. parallel to the conveyor axis when viewed laterally, and a relatively small vertical displacement component 100, i.e. dipsosed perpendicularly to the longitudinal conveyor axis when viewed laterally. If the conveyor is horizontal, the angle 97 can be typically between 30 degrees and 40 degrees. As stated previously, typical vibrating conveyors can be operated to convey material uphill or downhill, with inclines of the pan of between 0 and 8 degrees.

Because of the direct connection between the first members and the conveyor pan, the first members will follow a motion identical to that of the conveyor pan and thus impart a conveying motion to coarse material passing over the screen assembly. Similarly, because of the connection of the second members to the balancing structure, the second members, and associated third members will follow a motion identical to that of the balancing bars 33. The bars 33 have a motion that is similar to that of the pan, but is operated 180 degrees out-of-phase. Consequently, the second members will also impart a conveying motion to material carried across the screen on the second members. Thus, the first, second and third members of the screen assembly, all contribute to applying a conveying motion to coarse material as it passes over the screen, thus contrasting with some prior art devices which merely vibrate material on the screen, and do not contribute to a conveying motion at the same time, which can detract from conveying efficiency.

It can be seen that the method according to the invention comprises vibrating the first set 61 of transversely spaced, longitudinally extending first members 63, and vibrating the second set 62 of transversely spaced apart, longitudinally extending second members 64 out-of-phase with vibrations of the first set. In the structure as shown, the method also includes locating a plurality of longitudinally spaced apart, transversely extending third members, i.e. the transverse members 68, which extend between adjacent first and second members to define the plurality of screen openings 77 between the first, second and third members. Thus, the third members are mounted so as to be out-of-phase with vibrations of the said one of the first or second sets of longitudinally extending members, and are preferably mounted so as to be vibrated in phase with the remaining set of longitudinally extending members.

ALTERNATIVES

In the structure as described, the first members, which are parallel sided plates, vibrate in phase with the conveyor pan, and the second members, in combination with the transversely extending third members vibrate in phase with the dynamic balancing structure, and thus are out-of-phase with the conveyor pan. Clearly, the first members can be interchanged with the second and third members, so that the parallel sided plate first members could be connected to the dynamic balancing system to vibrate in phase therewith, and the combination of the second and third members could be directly attached to the conveyor pan to vibrate in phase therewith.

As disclosed, the second members provide mounting means for the third members, which extend in opposite directions from the particular second member at all longitudinal stations along the second member. Clearly, while it is preferred to have the third member's extending from both sides of a second member for symmetry and balance, if necessary the third members could extend from one side of each second member at all longitudinal stations, from one side of each first member.

Figure 8:
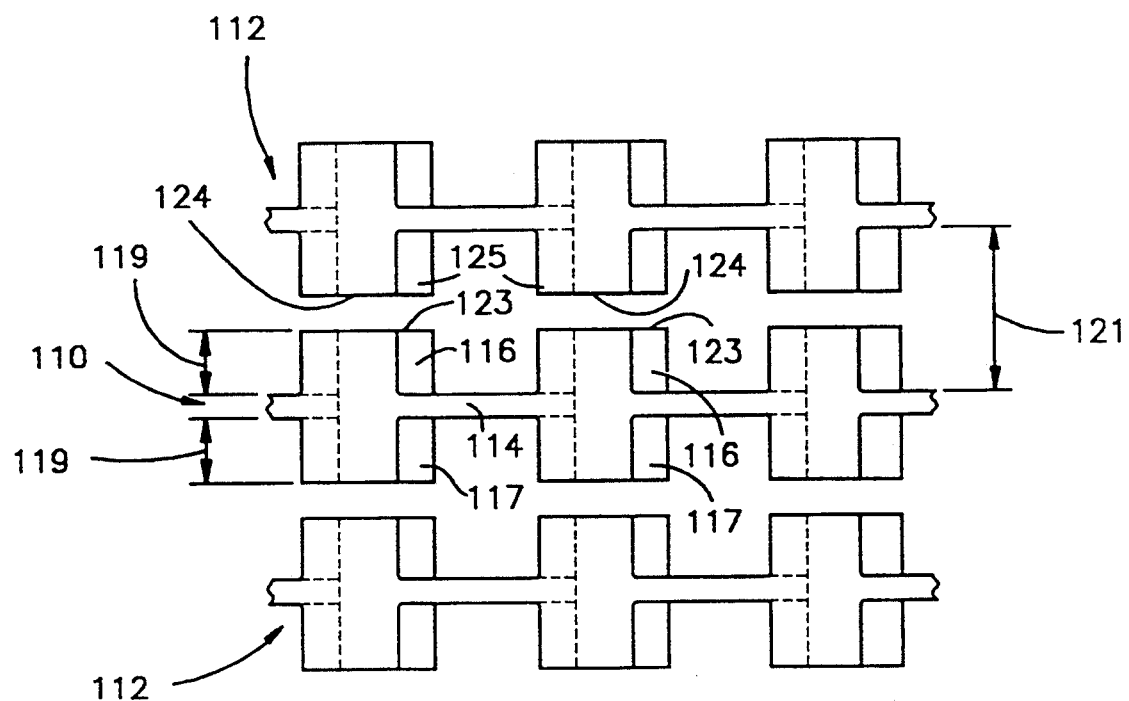
FIG. 8 is a simplified fragmented top plan view of alternative screening members according to the invention.
Figure 9:
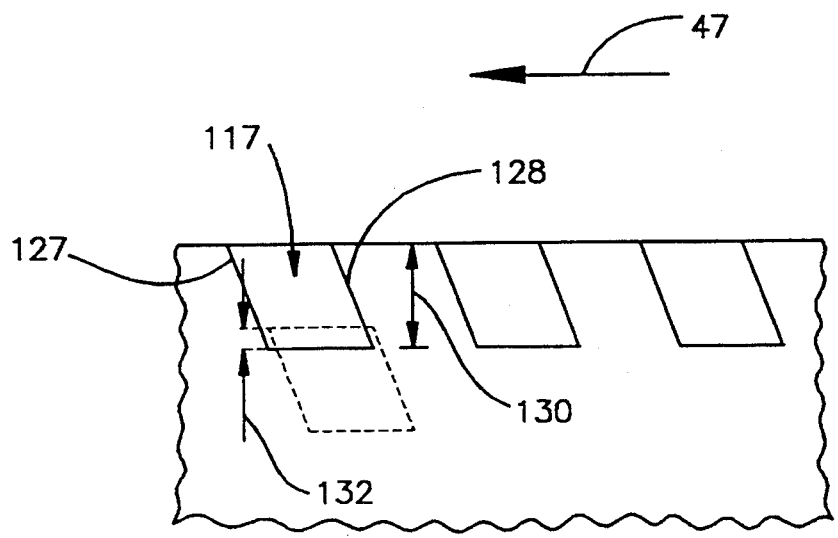
FIG. 9 is a simplified side elevation of one of the members of FIG. 8.

Yet a third alternative means of mounting the third members is shown in FIGS. 8 and 9.

The invention has been described for use with a dynamically balanced conveyor, in which there is a direct, simple mechanical connection between the balancing structure and the second members of the screen. This provides an out-of-phase vibration for the second members and associated third members without requiring an additional power source or vibrating structure. This is the preferred means, as it is a relatively simple connection, and dynamic balance is still maintained. The invention could also be used with a vibrating conveyor which is not dynamically balanced, so that at least one set of the longitudinally extending, transversely spaced members are vibrated with the conveyor pan 22, and the remaining set could be vibrated so as to be out-of-phase with the pan, by an alternative eccentric drive mechanism, which normally powers the pan, but could also be used to power the vibration of the second members. Alternatively, a separate eccentric drive mechanism could be used, or in a least preferred alternative, the second members could remain stationary while only the first members vibrate. In this latter, non-preferred alternative, for self-cleaning it is considered that the third members should be fitted on the first members, so that a larger area of the screen is provided with a vibrating motion which assists in driving material along the conveyor.

FIGS. 8 and 9

Referring to FIG. 8, an alternative first member 110 is attached to a rectangular frame, not shown, to vibrate with the conveyor pan (not shown) and is located between a pair of alternative second members 112 attached to vibrate in phase with the dynamic balancing system, not shown. The first and second members are essentially identical and thus only the first member 110 will be described in detail. The member 110 includes a straight, plate-like longitudinal portion 114 and pairs of alternative transversely extending lateral projections or third members 116 and 117 which extend in opposite directions from the longitudinal member to a distance which defines transverse width of the projection and is slightly less than half spacing 121 between adjacent first and second members. Thus the alternative third members and 117 are half the transverse width of the third members 68 or 72 of FIG. 6 for a fixed member spacing. The third members 116 on one side of the first member have longitudinally aligned end faces 123 which are closely spaced from opposed, longitudinally aligned end faces of similar third members 125 of an adjacent second member 112. At a particular position of a cycle of vibration as shown in FIG. 8, the third members 116 of the first member 110 are transversely aligned with the third members 125 of the second members 112, however in normal operation the third members on one member will be moving longitudinally past the third members on the adjacent member.

As best seen in FIG. 9, transversely aligned side faces 127 and 128 of a typical third member 117 are obliquely inclined in the feed direction, shown as arrow 47, with respect to the vertical, so as to reduce chances of material jamming between adjacent members as the members oscillate. If necessary, bearing pads, not shown, could be provided in some end faces of the third members to reduce problems that might otherwise arise should there be occasional contact between oppositely facing end faces of the third members. In this latter alternative, there is a risk of a catastrophic locking between projecting third members of each side, which might arise from severe transverse deflection of the members towards each other. To avoid this risk, the amplitude of vibration of the first and second members is less than an overall longitudinal dimension 130 so as to provide a minimum overlap 132 between adjacent end faces, to prevent the possible interference which might otherwise arise.

In the alternative structure of FIG. 9, where the spacing 121 between adjacent first and second members is occupied by projections or third members having a transverse width of less than one half the spacing 121, it can be seen that the third members associated with the first members can be considered a first group of the third members, and the third members associated with the second members can be considered a second group of the third members. Thus, in the FIG. 9 embodiment, the first members serve as a third vibrating means for vibrating the first group of the third members in phase with the first members, and the second members serve as a fourth vibrating means for vibrating the second group of third members in phase with the second members. Clearly, other means for vibrating the third members could be devised, if necessary a third independent vibrating means, could be provided, but this would increase the complexity with no gains in performance. In any arrangement of the third members, preferably the first, second and third members have respective upper portions or surfaces which are co-planar with each other, and with the end frame members and side frame members, and with the pan of the conveyor.

In the alternative, the third and fourth mounting means is seen to be a direct mechanical connection of the first and second group, to either the first or second members to vibrate therewith.

I claim:

1. A method of screening material by size, while conveying material on a vibrating conveyor pan of a dynamically balanced vibrating conveyor apparatus along a longitudinal conveyor axis thereof, the method comprising the steps of:

(a) vibrating a first set of transversely spaced apart, longitudinally extending first members in phase with vibrations of the conveyor pan, which pan is subjected to an essentially linear vibrating motion having a relatively large displacement component disposed parallel to the longitudinal conveyor axis and a relatively small displacement component disposed perpendicularly to the longitudinal conveyor axis, so that the material is transported along the conveyor, (b) vibrating a balancing structure 180 degrees out-of-phase with vibrations of the conveyor pan so as to dynamically balance the conveyor apparatus, (c) vibrating a second set of transversely spaced apart, longitudinally extending second members in phase with the vibrations of the balancing structure so as to be out of phase with the vibrations of the first set, the second members being subjected to an essentially linear vibrating motion having a relatively large displacement component disposed parallel to the longitudinal conveyor axis and a relatively small displacement component disposed perpendicularly to the longitudinal conveyor axis, some of the second members being located between some of the first members, and (d) vibrating a plurality of longitudinally spaced apart, transversely extending third members which are connected to either or both of the first or second members to vibrate in phase therewith, the third members extending between adjacent first and second members to define a plurality of screen openings between the first, second and third members.

2. A method as claimed in claim 1 further characterized by:

(a) vibrating the third members in phase with vibrations of the second members.

3. A method as claimed in claim 1 further characterized by:

(a) locating upper portions of the first, second and third members within a plane.

4. A method as claimed in claim 1 further characterized by:

(a) connecting the second set of second members to the balancing structure so that the second set of second members vibrate in phase with the balancing structure, and out-of-phase with the first set of first members.

5. A method as claimed in claim 1, further comprising:

(a) connecting the second set of second members to the balancing structure so that the second set of second members vibrates in phase with the balancing structure, and (b) vibrating the balancing structure with the same vibrating mechanism used to vibrate the conveyor pan but operated at 180 degrees out-of-phase with the first set of first members, so as to maintain the out-of-phase relationship between the first and second members.

6. A method as claimed in claim 1, further comprising:

(a) locating a lower conveyor pan beneath the first and second members to collect relatively fine material passed therebetween, and (b) connecting the lower conveyor pan to the balancing structure to vibrate in phase therewith and to maintain dynamic balance.

7. A method as claimed in claim 1 further characterized by:

(a) substantially directly connecting the second members to the balancing structure.

8. A screening apparatus mountable in a vibrating conveyor pan of a dynamically balanced vibrating conveyor apparatus for screening material by size while conveying material along a longitudinal conveyor axis of the conveyor apparatus, the conveyor apparatus having a balancing structure operable 180 degrees out-of-phase with vibrations of the conveyor pan so as to dynamically balance the conveyor apparatus, the screen assembly comprising:

(a) first and second sets of transversely spaced apart, longitudinally extending first and second members respectively, the members being parallel to each outer and alignable with the longitudinal conveyor axis, some members of the second set being locatable between some members of the first set, the first set being mountable on the conveyor pan to vibrate in phase therewith along the longitudinal axis, the second set being mountable to vibrate in phase with the balancing structure so as to vibrate 180 degrees out of phase with the vibrations of the first set, the conveyor pan being subjectable to an essentially linear vibratory motion having a relatively large displacement component disposed parallel to the longitudinal conveyor axis, and a relatively small displacement component disposed perpendicularly to the longitudinal conveyor axis so that material thereon is transported along the conveyor, and the second members being vibratable to have an essentially linear vibrating motion having a relatively large displacement component disposed parallel to the longitudinal conveyor axis and a relatively small displacement component disposed perpendicularly to the longitudinal conveyor axis, and (b) a plurality of longitudinally spaced apart, transversely extending third members located between adjacent first and second members so as to define a plurality of screen openings between the first, second and third members, the third members being connected to either or both of the first or second sets of longitudinally extending members to vibrate in phase therewith.

9. An apparatus as claimed in claim 8 in which the apparatus further comprises:

(a) first mounting means for connecting the first members together and to the conveyor pan, (b) second mounting means for connecting the second members together and to a portion of the conveyor apparatus so as to vibrate out-of-phase with the conveyor pan.

10. An apparatus as claimed in claim 9 in which:

(a) first mounting means for connecting the first members together and to the pan of the conveyor, so that the first set of first members vibrates in phase with the conveyor pan and, (b) second mounting means for connecting the second members together and to the balancing structure of the conveyor apparatus so as to be vibrated in phase with the balancing structure.

11. An apparatus as claimed in claim 9 in which the first mounting means for connecting the first members together and to the conveyor comprises:

(a) a rectangular frame securable to the conveyor pan and including a pair of longitudinally extending side frame members and a pair of transversely extending end frame members, (b) the first members being secured to the frame members to provide first mounting means.

12. An apparatus as claimed in claim 11 in which:

(a) at least two longitudinally spaced apart, transversely extending support bars, the bars being connectable to structure associated with the balancing structure to vibrate therewith, (b) the second members being secured to the support bars so as to extend longitudinally of the conveyor, and be positioned between the first members.

13. An apparatus as claimed in claim 8 in which:

(a) the third members are connected to the second members for vibration therewith.

14. An apparatus as claimed in claim 8 in which:

(a) the longitudinally extending first and second members are spaced transversely apart at a member spacing, (b) the third members are connected to either set of the longitudinally extending members, the third members extending from each side of the longitudinal member outwardly therefrom in opposite directions to a depth no greater than the member spacing.

15. An apparatus as claimed in claim 8 in which:

(a) the first and second members have respective upper portions which are generally co-planar with each other.

16. An apparatus as claimed in claim 11 in which:

(a) the end frame members and the side frame members have generally co-planar upper surfaces, (b) the first, second and third members have respective upper surfaces which are co-planar with each other and with the end frame members and side frame members.

17. An apparatus as claimed in claim 8, further comprising:

(a) a lower conveyor pan locatable beneath the first and second members to receive relatively fine material passing therebetween, and (b) connecting means for connecting the lower conveyor pan to the balancing structure so as to vibrate in phase therewith.

18. An apparatus as claimed in claim 8 in which:

(a) said second members are substantially directly connected to said balancing structure.

19. A dynamically balanced vibrating conveyor apparatus for conveying and screening material carried on the conveyor, the apparatus comprising:

(a) a conveyor pan for receiving and conveying material along a longitudinal axis of the conveyor, (b) first vibrating means for vibrating the conveyor pan to convey the material along the longitudinal axis, the first vibrating means subjecting the conveyor pan to an essentially linear vibratory motion having a relatively large displacement component disposed parallel to the longitudinal conveyor axis, and a relatively small displacement component disposed perpendicularly to the conveyor axis so that material on the conveyor is transported along the conveyor, (c) a dynamic balancing structure vibratable at 1880 degrees out-of-phase with vibrations of the conveyor pan so as to dynamically balance the conveyor apparatus, and (d) a screen assembly comprising:

(i) a first set of transversely spaced apart, longitudinally extending first members, (ii) first mounting means for connecting the first members together and to the conveyor pan to be aligned with the longitudinal axis of the conveyor apparatus, and to vibrate the first members in phase with the conveyor pan, (iii) a second set of transversely spaced apart, longitudinally extending second members, some members of the second set being disposed between some members of the first set, the second members being parallel to the first members, (iv) second mounting means for connecting the second members together, (v) connecting means for connecting the second mounting means to vibrate in phase with vibrations of the dynamic balancing structure for vibrating the second members 180 degrees out of phase with vibrations of the first members, the second members being vibratable to have essentially linear vibrating motion having a relatively large displacement component disposed parallel to the longitudinal conveyor axis and a relatively small displacement component disposed perpendicularly to the longitudinal conveyor axis.

(vi) a plurality of longitudinally spaced apart, transversely extending third members located between adjacent first and second members so as to define a plurality of screen openings between the first, second and third members, and (vii) third mounting means for mounting and connecting the third members to either or both of the first or second members so as to vibrate in phase with either the first or second members.

20. An apparatus as claimed in claim 19 in which the dynamic balancing means includes:

(a) a pair of balancing bars, one bar being provided on each side of the conveyor pan, (b) the second vibrating means includes vibrators connected to the balancing bars to vibrate the bars out-of-phase with respect to the conveyor pan, (c) at least two longitudinally spaced apart, transversely extending support bars, the bars having opposite ends connected to adjacent balancing bars to vibrate therewith, the support bars having intermediate portions connected to the second members.

21. An apparatus as claimed in claim 19 in which:

(a) the third members are connected to the second members for vibration therewith.

22. An apparatus as claimed in claim 19, further comprising:

(a) a lower conveyor pan connected beneath the first and second members to receive relatively fine material passing therebetween, and (b) connecting means for connecting the lower conveyor pan to the balancing structure so as to vibrate in phase therewith and to maintain dynamic balance.

23. An apparatus as claimed in claim 19 in which:

(a) said second members are substantially directly connected to said dynamic balancing structure.

* * * * *